June 30, 1925.  
C. REINEKE  
1,544,482  
INTERNAL COMBUSTION MULTISTROKE ENGINE  
Original Filed July 17, 1920   6 Sheets-Sheet 6
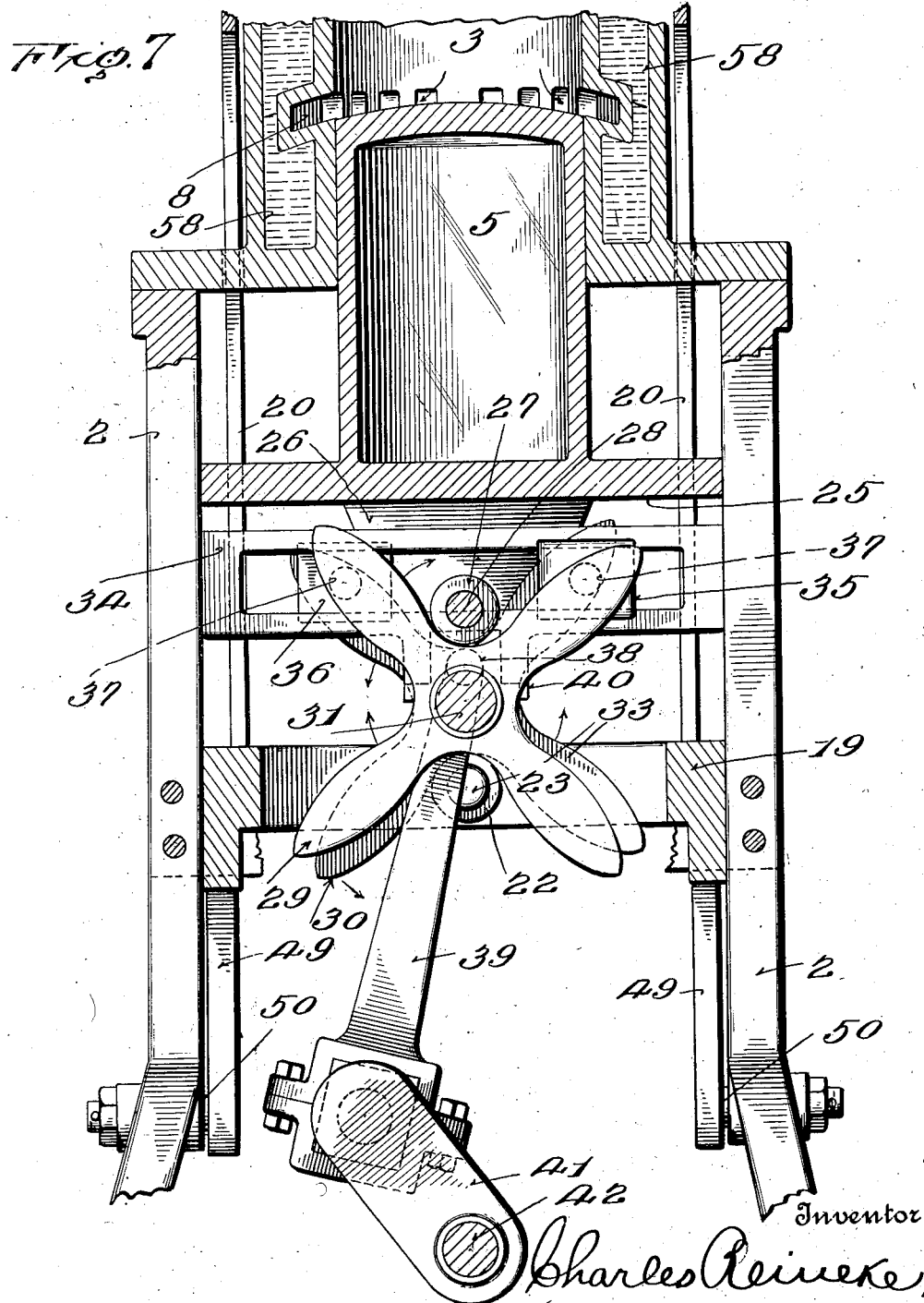
Inventor  
Charles Reineke,  
By Wm. E. Dyre.  
Attorney Patented June 30, 1925.

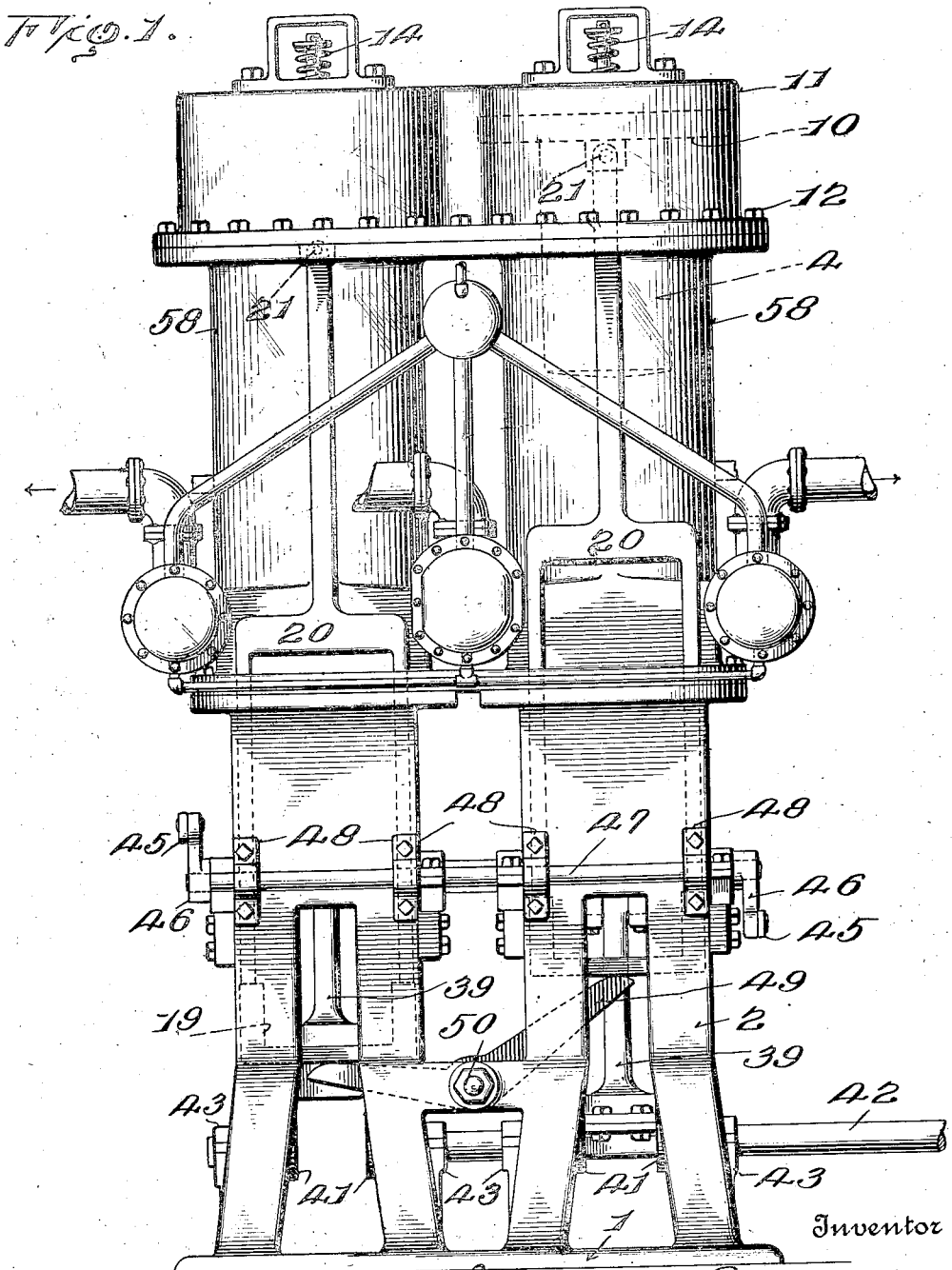

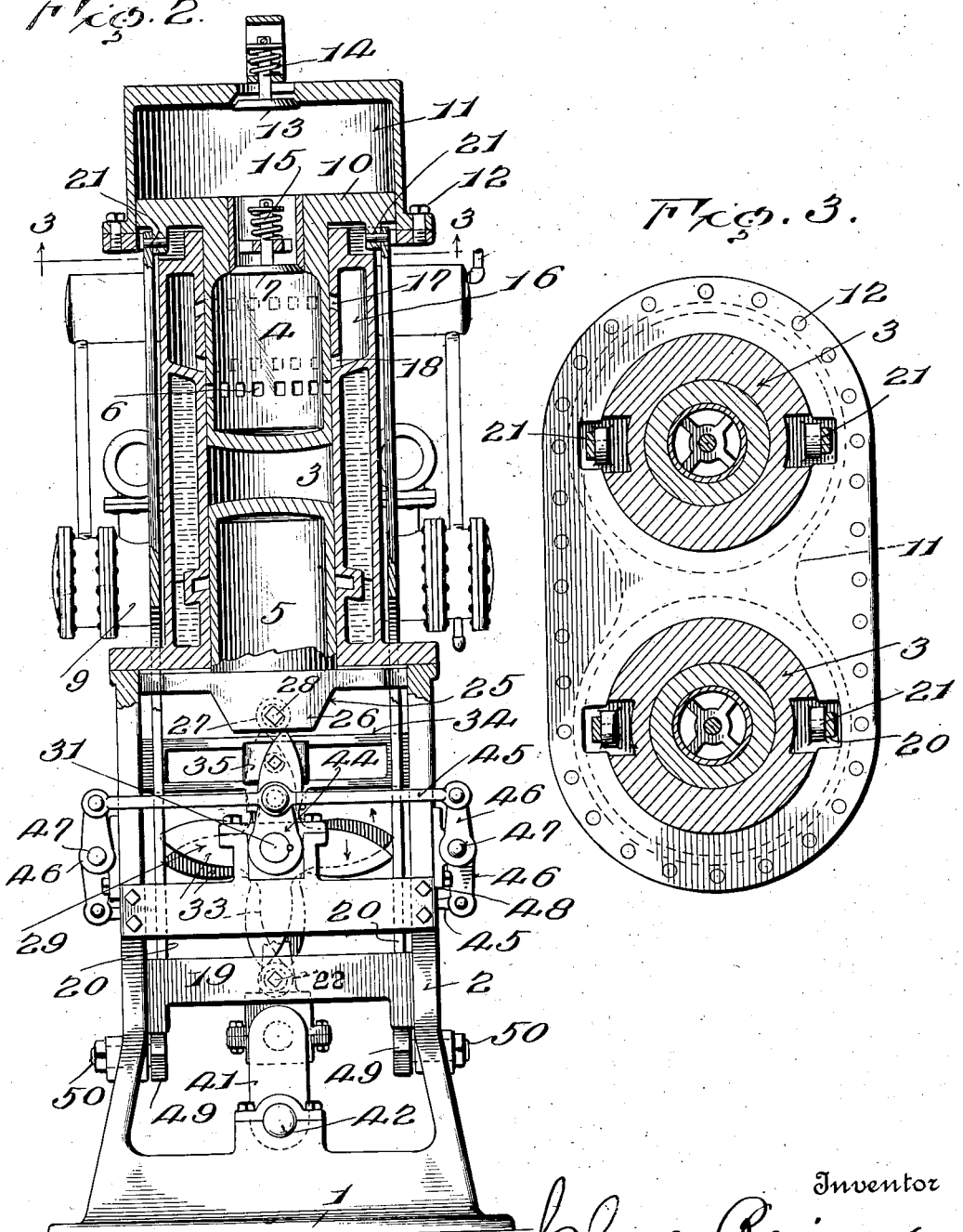

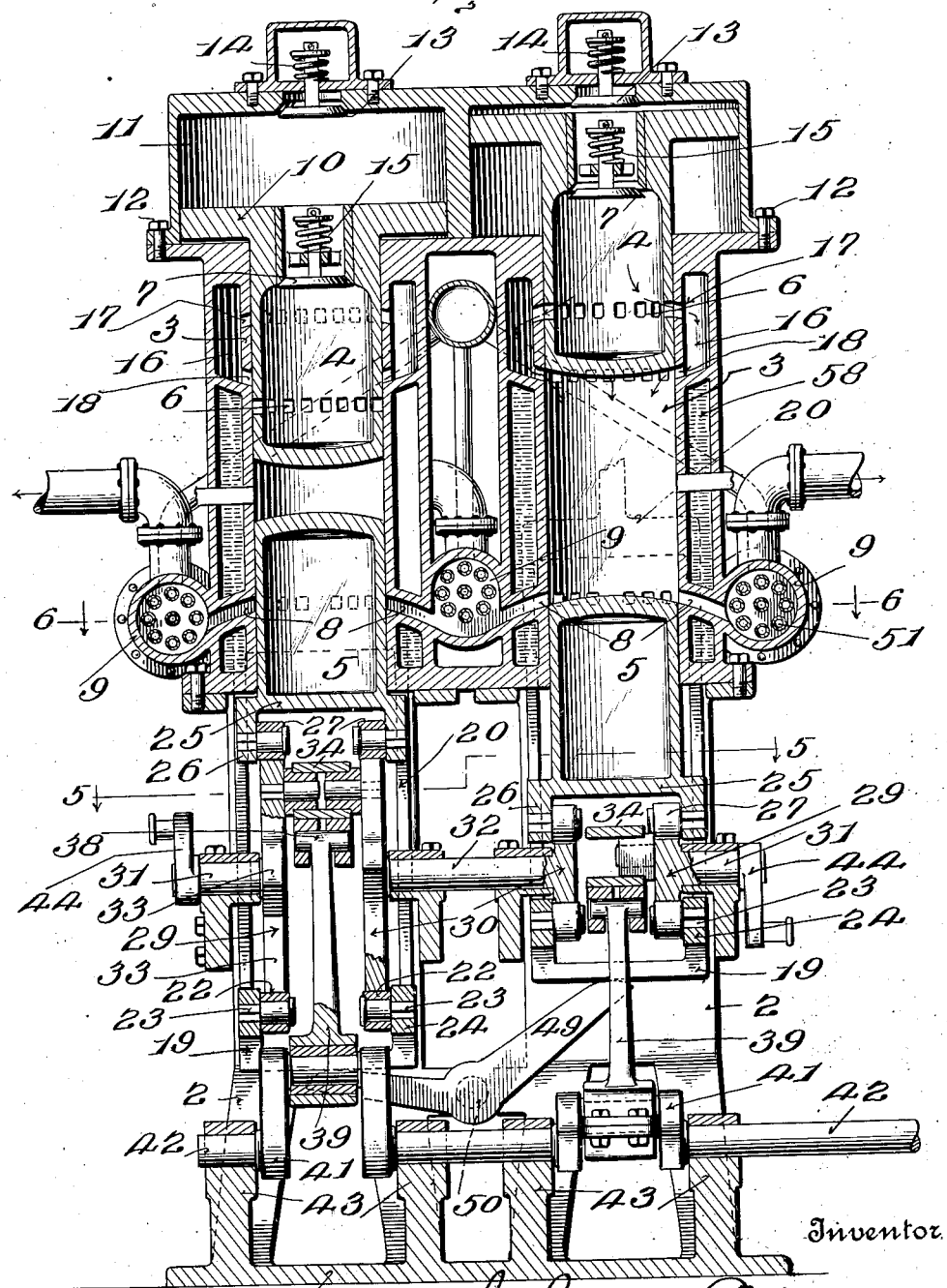

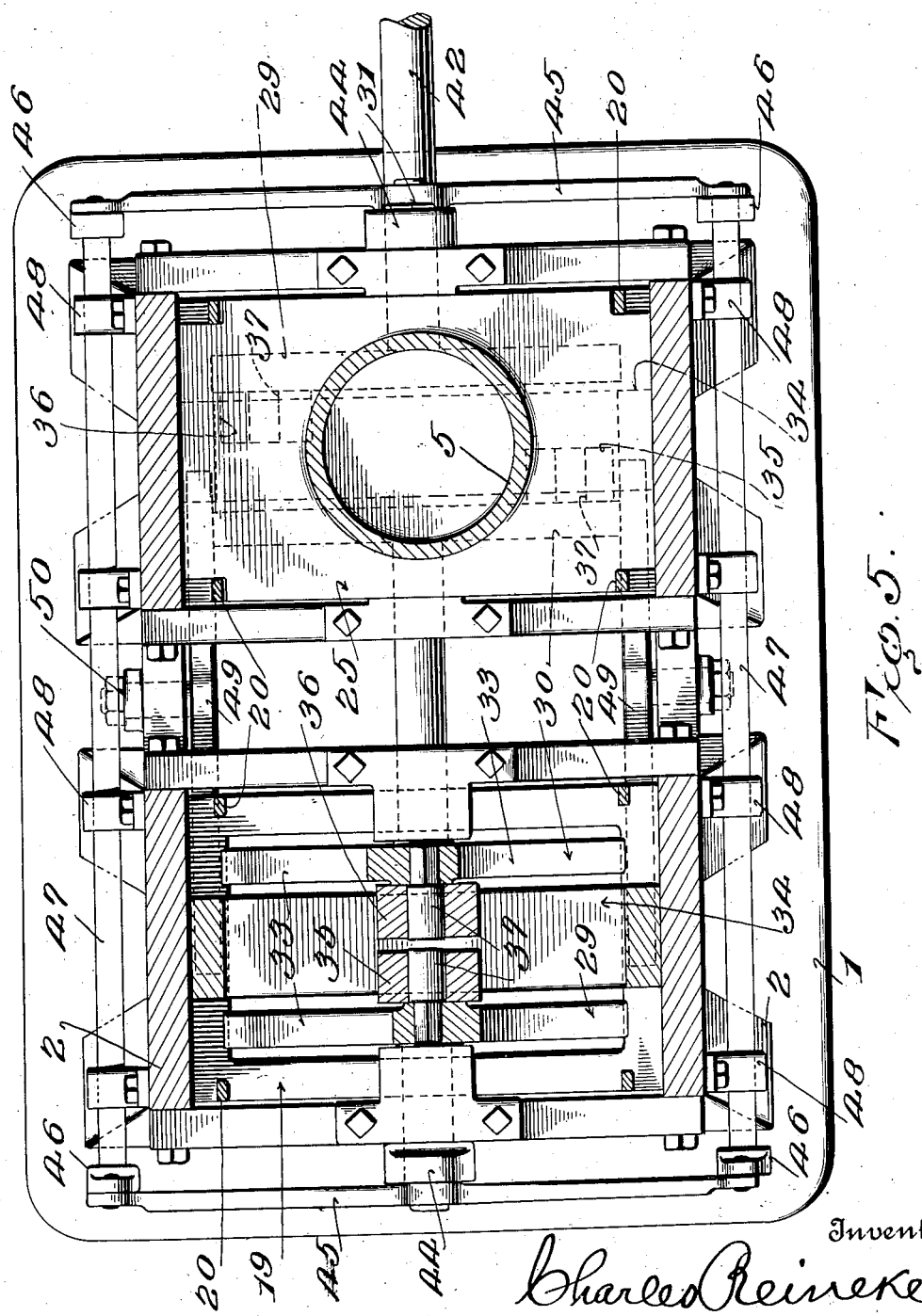

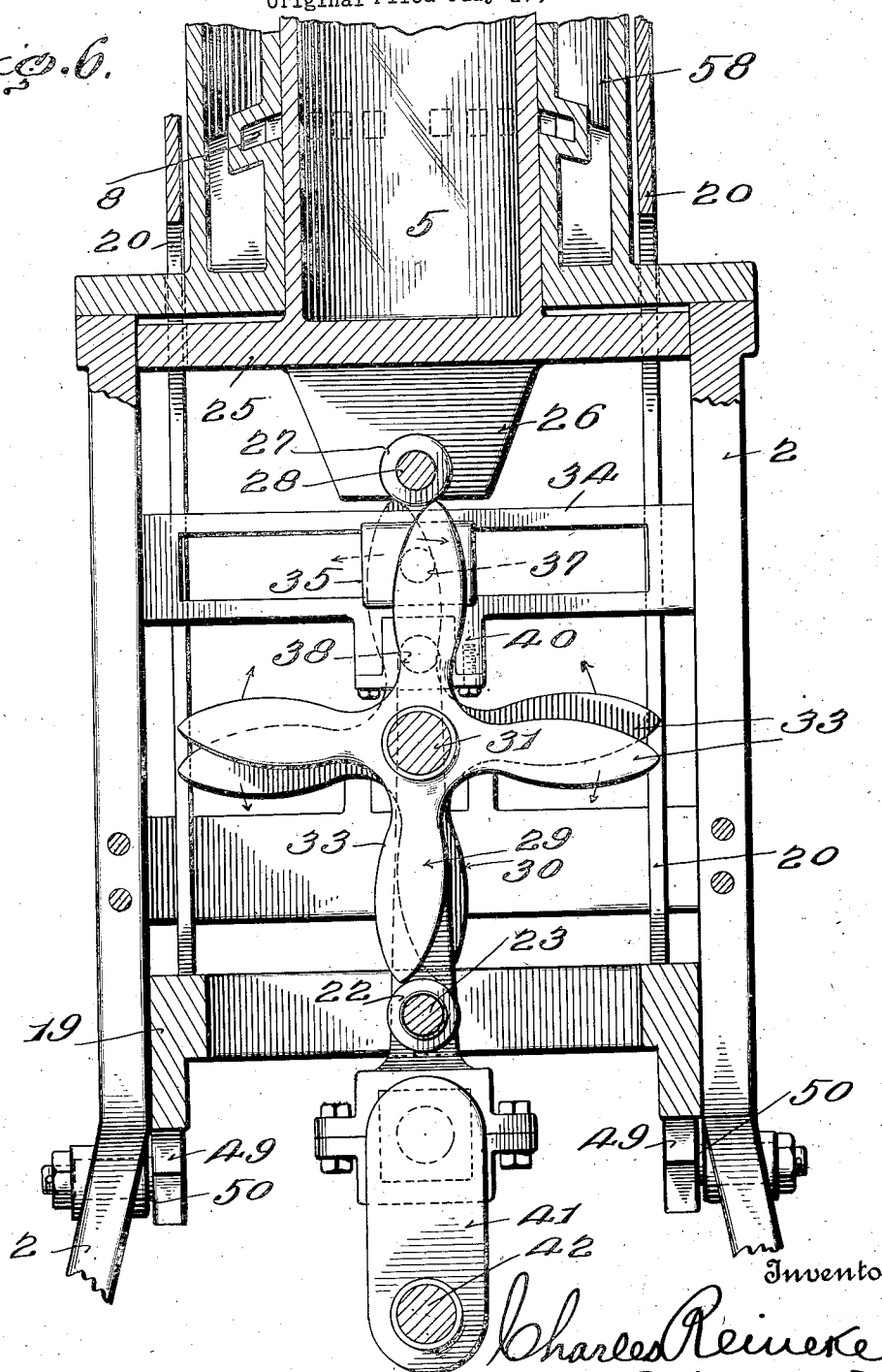

1,544,482

UNITED STATES PATENT OFFICE.

CHARLES REINEKE, OF NEW YORK, N. Y., ASSIGNOR TO THE REINEKE MOTOR CORPORATION, OF NEW YORK, N. Y., A CORPORATION OF DELAWARE.

INTERNAL-COMBUSTION MULTISTROKE ENGINE.

Application filed July 17, 1920, Serial No. 396,902. Renewed April 9, 1925.

*To all whom it may concern:*

Be it known that I, CHARLES REINEKE, a citizen of the United States, residing at New York, in the county of New York and State of New York, have invented certain new and useful Improvements in Internal-Combustion Multistroke Engines; and I do hereby declare the following to be a full, clear, and exact description of the invention, such as will enable others skilled in the art to which it appertains to make and use the same.

This invention relates to internal combustion engines and more particularly to that type of engine set forth in my co-pending application Serial Number 311,976, filed July 19, 1919.

An object of this invention is to produce an internal combustion engine having a relatively high speed multi-stroke piston travel designed to impart a comparatively slow speed of rotation to the power shaft, and a novel power translating means whereby the aforesaid rapid reciprocating movement of the piston is converted into a relatively slow rotary movement.

Another object of the invention is the production of a multi-stroke internal combustion engine including oppositely moving pistons, and means for smoothly transmitting the reciprocating movement of the pistons to a rotating crank carried by the power shaft in a positive manner without the interpositioning of guides and other complicated mechanism which would materially increase the friction.

A further object of this invention is to produce an internal combustion engine including in combination a plurality of cylinders, oppositely moving pistons arranged in each cylinder, novel means for translating the reciprocatory movement of the pistons in each cylinder to a power shaft and more particularly to a crank thereon at a reduced speed of rotation, and means for maintaining the several translating means of each cylinder in timed relation.

A still further object of the invention is the production of a compact engine unit of simple and durable construction for marine and similar uses, wherein advantages of assembling, repair and low cost of production are important factors.

With these and other objects in view the invention further consists in the arrangement and combination of the several parts hereinafter described and pointed out in the appended claims.

In the accompanying drawings, in which an embodiment of my invention is disclosed as applied to a two cylinder engine, Figure 1 is a side elevation of an internal combustion engine constructed in accordance with my invention;

Figure 2 is a vertical transverse sectional view partly in elevation taken at right angles to Figure 1;

Figure 3 is a detail horizontal sectional view on the line 3—3 of Figure 2;

Figure 4 is a vertical longitudinal sectional view through the engine as shown in Figure 1;

Figure 5 is a horizontal sectional view on a slightly enlarged scale taken on the line 5—5 of Figure 4;

Figure 6 is an enlarged detail sectional view of the motion translating means with the opposed pistons in compressing position ready to fire, and Figure 7 is a similar view of the motion translating means with the opposed pistons in separated position after firing.

The present invention has been primarily designed for use in marine propulsion where it is desirable to obtain a reduction of the high speed piston travel without the interpositioning of various forms of reduction gearing. My invention is equally applicable to other power uses of either stationary or mobile character, such for example, as heavy duty power generating plants; automobiles and the like. It will be further understood, that while I have shown and principally described an internal explosive type of engine, that the utilization of oil, compressed air, steam, and other power mediums may be employed and such variations in design made in the engine as will permit of its use without departing from the spirit of the invention.

The invention comprises among other things a vertically arranged cylinder in which is reciprocally mounted in opposed relation two pistons, and a novel motion translating mechanism of scissors-like action whereby the reciprocating movement is transmitted through a multiplicity of power strokes of the piston to a revolvable shaft for producing a single revolution thereof. The fuel charge is designed to be admitted between the opposed pistons and fired by compression or any suitable ignition device as will be understood.

The translating means interposed between the pistons and the power shaft comprises a series of reversely revoluble cam like elements which are designed to co-act with each other and rollers carried by the piston.

A movable cross head is connected to the revoluble cam elements, and is in turn connected by means of a crank to the power shaft.

Reference being had to the drawings wherein corresponding reference characters designate similar parts in the several views, the engine includes a base 1 having extending therefrom suitable uprights or standards 2 to the upper flanges of which are secured the cylinders 3.

Oppositely disposed pistons 4 and 5 are arranged in each cylinder, the upper piston 4 being provided with a series of ports 6 associated with a fuel inlet valve 7, and the lower piston 5 being designed to cooperate with exhaust passageways 8 communicating with the boilers or steam producing drums 9.

The piston 4 is provided with a flanged portion 10 movably mounted in a chamber or cylinder 11 secured to the upper flanges of the cylinders 3 by means of bolts 12 as shown. A valve 13 is positioned in the top wall of the chamber 11 and serves as the inlet for the fuel which may be brought from any suitable source of supply (not shown). The valve 13 is spring controlled so as to open inwardly against the tension of a spring 14 upon the downstroke of the piston 4, and thereby draw in a charge of fuel.

The valve 7 provided in the piston 4 is likewise spring controlled and is designed to open upon the upstroke of the piston 4 against the tension of the spring 15. The alternate opening of these respective valves 7 and 13 serves to control the admission of the fuel into the piston 4 from where it passes outwardly through the ports 6 into a chamber 16 and thence to the cylinder 3 between the opposed pistons for exploding.

The chamber 16 preferably encircles the cylinder 3, and is provided with two series of ports, the upper series 17 of which is designed to register with the ports 6 of the piston 4 for permitting the fuel to pass from the interior of the piston to the chamber 16, and the lower series 18 of which is adapted to be uncovered by the piston 4 for allowing the fuel to pass from the chamber 16 into the cylinder 3.

The pistons 4 and 5 are movably associated with relation to each other, and with relation to the pistons in the adjoining cylinder; the relative positions of said pistons being clearly shown in Figure 4, wherein the firing and exhaust positions of the co- operating pistons in each cylinder are shown.

The upper piston 4 is connected to a frame section 19 by means of forked connections 20 arranged on opposite sides of the piston, and having their upper ends connected at 21 to ears depending from the flange 10 of the piston. The frame section 19 is provided with rollers 22 revolvably supported upon studs or pins 23 extending from opposite side bars 24 constituting part of the frame section.

The lower piston 5 is also provided with a lower flange section 25 from which depend ears 26. Rollers 27 are revolvably supported upon studs or pins 28 projecting from the ears 26.

The upper rollers 27 and the lower rollers 22 of the respective frame sections constitute a part of, and are designed to co-act with, a novel form of motion translating means now to be described.

Cooperatively associated with the aforesaid rollers 22 and 27 are cam elements 29 and 30 spaced apart as shown, and revolubly mounted for opposite rotation upon separated shafts 31 and 32, see Figure 4. As shown, each cam element is formed with radiating arms or wings 33, the number of which may be varied to increase or decrease the multiplicity of the stroke of the engine as will be understood. In the present embodiment of the invention four cam arms are shown for producing four strokes of the engine for one revolution of the power shaft.

In operation, it will be seen that as the pistons 4 and 5 are separated, the respective rollers 22 and 27 will be moved toward each other, said rollers acting to separate the cooperating arms of the respective cam elements 29 and 30, in a scissors-like operation as shown in detail in Figures 6 and 7. The effect of this movement is to revolve the cam elements in opposite directions as indicated by the arrows, the rollers following the peripheral contour of the arms of each cam as will be understood.

Cooperatively associated with the cam elements 29 and 30 is a cross-head connection comprising a vertical movable frame 34 in which are mounted oppositely sliding blocks 35 and 36 connected respectively to one of the arms of each of the cam elements 29 and 30. A pin 37 projecting from one of the arms of each cam element extends into each sliding block.

The sliding blocks 35 and 36 are arranged to move past each other in the frame 34, as best shown in Figures 4 and 5, as the cam elements are revolved in opposite directions.

Connected to the underside of the cross-head frame section 34 at an intermediate point thereof is one end 38 of a connecting rod 39. A suitable bearing 40 is shown as constituting this connection, although it will be understood that various other types of connections may be employed.

The opposite end of the connecting rod 39 is connected to the crank 41 carried by the crank or power shaft 42, which latter may be connected to any form of driving mechanism. Bearings 43 are adapted to support the shaft 42 as shown. The adjacent cranks 41 are shown as set at 90 degrees for relatively positioning the pistons in each cylinder as hereinbefore mentioned.

The foregoing construction permits of the vertical reciprocation of the cross head connection through the revolving of the cam elements, and it will be seen that the reciprocatory movement of the pistons is converted into a rotary movement of the power shaft by the moving of the connecting rod interposed between the cross head frame section and the crank carried by the power shaft.

The means for maintaining a plurality of motion translating devices in timed relation includes a crank 44 keyed on the shaft 31, and a connecting rod 45 carried by said crank. The opposite ends of the connecting rod 45 are each connected to cranks 46 secured to shafts 47 extending longitudinally of the engine and supported in suitable bearings 48. A similar connecting rod and associated cranks are provided upon the opposite side of the engine. From this construction it will be seen that the interconnected parts it will be seen that the relative movements of the motion translating devices are synchronously provided for. It will also be obvious that auxiliary devices such as oil pumps and other mechanism, may be driven from the shafts 47.

A sustaining means comprising levers 49 pivoted at 50 is provided for maintaining the uppermost pistons 4 in proper position with relation to the lowermost pistons 5. The opposite arms of these levers 49 extend outwardly and contact with the underside of the supporting frames 19 as best shown in Figures 1, 2 and 4. This feature of my invention constitutes the subject matter of another application and I shall not describe it in further detail herein.

In operation the fuel is drawn into the chamber 11 through the valve 13 upon the down-stroke of the piston 4 and more particularly the piston-like flange 10 carried thereby. Upon the up-stroke of the piston 4 valve 7 is unseated and the fuel charge is allowed to pass into the chambered interior of the piston from where it passes through the series of ports 6 and 17 into the encircling chamber 16. As the piston 4 moves past the inlet ports 18 upon its upstroke, the fuel charge rushes into the cylinder and is compressed therein upon the succeeding down-stroke of the piston 4 and the corresponding up stroke of the opposite piston 5 as will be understood. When the fuel has been compressed, it is exploded in any suitable manner and the pistons 4 and 5 are caused to separate, thereby bringing the rollers 22 and 27 toward each other and in operative lever-like contact with the cam elements 29 and 30 which are in turn caused to revolve in opposite directions as hereinbefore pointed out. The revolving of the cam elements causes the blocks 35 and 36 to slide in opposite directions within the frame section 34, thereby bringing the cross-head downwardly. The downward movement of the cross-head in turn causes the connecting rod 39 to move the crank 41 and the power shaft 42.

With the pistons fully extended following the explosion, the burnt charge is exhausted through the passageways 8 leading from the cylinder into the steam producing boilers 9.

The succeeding incoming fuel charge serves to accelerate the expulsion of the burnt gases so as to thoroughly scavenge the cylinder and eject all of the gases remaining from the preceding explosion.

The rollers 22 and 27 are designed to remain in peripheral contact with the arms of the cam elements and serve to force or spread the same successively upon each power stroke of the engine. Upon the return stroke of the arm, the cam elements as they continue to revolve in opposite directions serve to bear upon the respective rollers and return the pistons for the succeeding stroke. As shown the construction of the cam elements with four radial cam arms causes the translating of the rotary power from the reciprocating movement of the pistons to be imparted at a ratio of 4 to 1, thereby greatly reducing the speed of the power shaft but at the same time permitting of a maximum high speed explosive action of the pistons.

Suitable water jackets 58 are provided for the flowing of the water about the walls of the cylinder.

Various changes in the form of constructions and arrangement of the several parts may be resorted to and I do not limit myself to the disclosure herein set forth. It will be understood that various approved types of ignition devices can be utilized for exploding the fuel charges and I do not limit myself to any one of the different methods used to explode the charges of an internal combustion engine.

I claim:

1. In an internal combustion engine, the combination with a cylinder, of a plurality of pistons arranged therein, a power shaft, a crank for said shaft, and means including a connecting rod and oppositely moving cams operatively interposed between said pistons and crank for imparting a multiplicity of power strokes of the pistons to said power shaft for every revolution thereof during a single revolution of said crank.

2. In an internal combustion engine, the combination with a cylinder, of a piston arranged therein, a power shaft provided with a crank, and means interposed between said piston and crank for causing a multiplicity of power strokes of the piston to be imparted to said power shaft for every revolution thereof during a single revolution of the crank, said means including oppositely moving cams and a connecting rod having one end connected to said crank and the other end operatively connected to said cams.

3. In an internal combustion engine, the combination with a cylinder, of opposed pistons arranged therein, a power shaft, a crank for said shaft, and means including a connecting rod, oppositely moving cams and a slidable frame section connected with said pistons and crank for imparting a multiplicity of power strokes of said pistons to the power shaft for every revolution thereof during a single revolution of said crank.

4. In an internal combustion engine, the combination with a cylinder, of opposed pistons arranged therein, a power shaft, a crank for said shaft, and means including a movable cross head and oppositely moving cams interconnected with each of the said pistons and crank for imparting a multiplicity of power strokes of the pistons to the power shaft for every revolution thereof during a single revolution of said crank.

5. In an internal combustion engine, the combination with a cylinder of opposed pistons arranged therein, a power shaft, a crank for said shaft, and means interconnected with each of the aforesaid pistons and the crank for imparting a multiplicity of strokes of the pistons to the crank for effecting a single revolution of the power shaft, said means including a movable cross-head, a sliding block therein, and a revolving cam connected to said sliding block and operably associated with the aforesaid pistons.

6. In an internal combustion engine, the combination with a cylinder of opposed pistons arranged therein, a power shaft, a crank for said shaft, and means interconnected with each of the aforesaid pistons and the crank for imparting a multiplicity of strokes of the pistons to the crank for effecting a single revolution of the power shaft, said means including a movable cross-head, oppositely sliding blocks arranged therein, and oppositely revoluble cams connected to said blocks and operably associated with the aforesaid pistons.

7. In an internal combustion engine, the combination with a cylinder of opposed pistons arranged therein, a power shaft, a crank for said shaft, and means interconnected with each of the aforesaid pistons and the crank for imparting a multiplicity of strokes of the pistons to the crank for effecting a single revolution of the power shaft, said means including a vertically movable cross-head, horizontally sliding blocks arranged therein, oppositely revoluble cams connected to said blocks and rollers carried by said pistons and cooperatively associated with said cams.

8. In an internal combustion engine the combination with a cylinder of opposed pistons arranged therein, a power shaft, a crank for said shaft, a connecting rod for said crank, movable cross heads connected to said pistons, and means including revoluble cams associated with said cross heads and pistons for imparting a multiplicity of power strokes of the pistons to the power shaft for every revolution thereof during a single revolution of said crank.

9. In an internal combustion engine the combination with a cylinder of opposed pistons arranged therein, a power shaft, a crank for said shaft and means including oppositely revoluble cams interconnected with the aforesaid crank and a series of rollers carried by the pistons and operable against the oppositely revolving cams for imparting a multiplicity of strokes of the pistons to the crank for effecting a single revolution of the power shaft.

10. In an internal combustion engine the combination with a cylinder of opposed pistons arranged therein, a power shaft, a crank for said shaft and means including oppositely revoluble cams interconnected with the aforesaid crank and having a plurality of radial arms, and rollers carried by the pistons and operably movable between the oppositely revolving arms of the cams for imparting a multiplicity of strokes of the pistons to the crank for effecting a single revolution of the power shaft.

11. In an internal combustion engine, the combination with a plurality of cylinders, opposed pistons arranged in said cylinders, a power shaft having crank portions, a pair of oppositely rotating cams for each cylinder operatively connected with the pistons of that cylinder, and means operatively connecting each pair of cams with one of the crank portions of the power shaft.

12. In an internal combustion engine, the combination with a plurality of cylinders, opposed pistons arranged in each of said cylinders, a power shaft provided with crank portions, motion translating means interconnecting the pistons of each of said cylinders with a crank portion of the shaft and adapted to cause a multiplicity of strokes of the pistons of each cylinder to impart a single revolution only to the power shaft, said motion translating means including oppositely rotating cams actuated by the pistons, and power transmitting members actuated by the cams and connected to the crank portions of the shaft, and means including a shaft and a series of interconnected cranks carried thereby for connecting said motion translating means to each other whereby the synchronous operation of the interconnected translating mechanisms are evenly maintained.

13. In an internal combustion engine the combination with a plurality of cylinders, of opposed pistons arranged therein, a power shaft, a crank for said power shaft, means for imparting a multiplicity of strokes of the pistons to the crank for effecting a single revolution of the power shaft, said means including stub shafts, oppositely revoluble cams carried thereby, a movable cross-head connected to said cams, and a rod connecting said cross head with said crank; and means interconnected with said stub shafts for synchronously operating the aforesaid mechanism with relation to each cylinder.

14. In an internal combustion engine, the combination with a cylinder, of relatively high speed pistons arranged in said cylinder and adapted to move toward and away from each other, a relatively slow speed power shaft, and means including oppositely moving power transmitting devices interconnecting the pistons and power shaft for causing a multiplicity of power strokes of the pistons to impart a single revolution only to the shaft.

15. An internal combustion engine including a cylinder, opposed pistons arranged in said cylinder, rollers operatively connected to each of said pistons, oppositely rotating cams actuated by said rollers and each cam including outwardly extending spaced arms, a cross head movable toward and away from said cylinder and provided with a slot arranged at an angle to the axis of the cylinder, sliding blocks arranged in said slot and operatively connected to said cams, a power shaft, and means connecting said cross head to said shaft.

In testimony whereof I affix my signature, in presence of two subscribing witnesses.

CHARLES REINEKE.

Witnesses:
G. Y. POPE,
R. L. LAKE.